United States Patent [19]

Black

[11] Patent Number: 5,327,942

[45] Date of Patent: Jul. 12, 1994

[54] SEALING PLUG FOR APERTURES

[75] Inventor: Robert D. Black, Douglasville, Ga.

[73] Assignee: Trebor Corporation, Forest Park, Ga.

[21] Appl. No.: 881,206

[22] Filed: May 11, 1992

Related U.S. Application Data

[63] Continuation-in-part of Ser. No. 717,323, Jun. 18, 1991, abandoned.

[51] Int. Cl.⁵ ............................................... F16L 55/11
[52] U.S. Cl. ......................................... 138/89; 138/92; 217/110; 220/DIG. 19
[58] Field of Search ..................... 138/89, 92; 220/DIG. 19, 352; 217/110; 43/124

[56] References Cited

U.S. PATENT DOCUMENTS

| | | | |
|---|---|---|---|
| 220,773 | 10/1879 | Stewart | 217/110 |
| 2,196,785 | 4/1940 | Takiguchi | 220/DIG. 19 |
| 2,886,203 | 5/1959 | Goll | 217/110 |
| 2,950,835 | 8/1960 | Alvear | 217/110 |
| 3,578,027 | 5/1971 | Zopfi | 138/89 |

FOREIGN PATENT DOCUMENTS

| | | | |
|---|---|---|---|
| 1201761 | 1/1960 | France | 138/89 |
| 536228 | 11/1955 | Italy | 138/89 |
| 914647 | 1/1963 | United Kingdom | 138/89 |

*Primary Examiner*—Philip R. Coe
*Assistant Examiner*—Tony G. Soohoo
*Attorney, Agent, or Firm*—James A. Hinkle

[57] ABSTRACT

A resilient plug for sealing drilled holes in a solid surface to prevent the discharge from the hole of fluids or chemicals. The plug is of tubular shape and has a flat top surface and a tubular side wall from which a plurality of sealing ribs project to engage the side wall of a drilled hole. The ribs prevent the passage of fluids or chemicals from the hole.

2 Claims, 2 Drawing Sheets

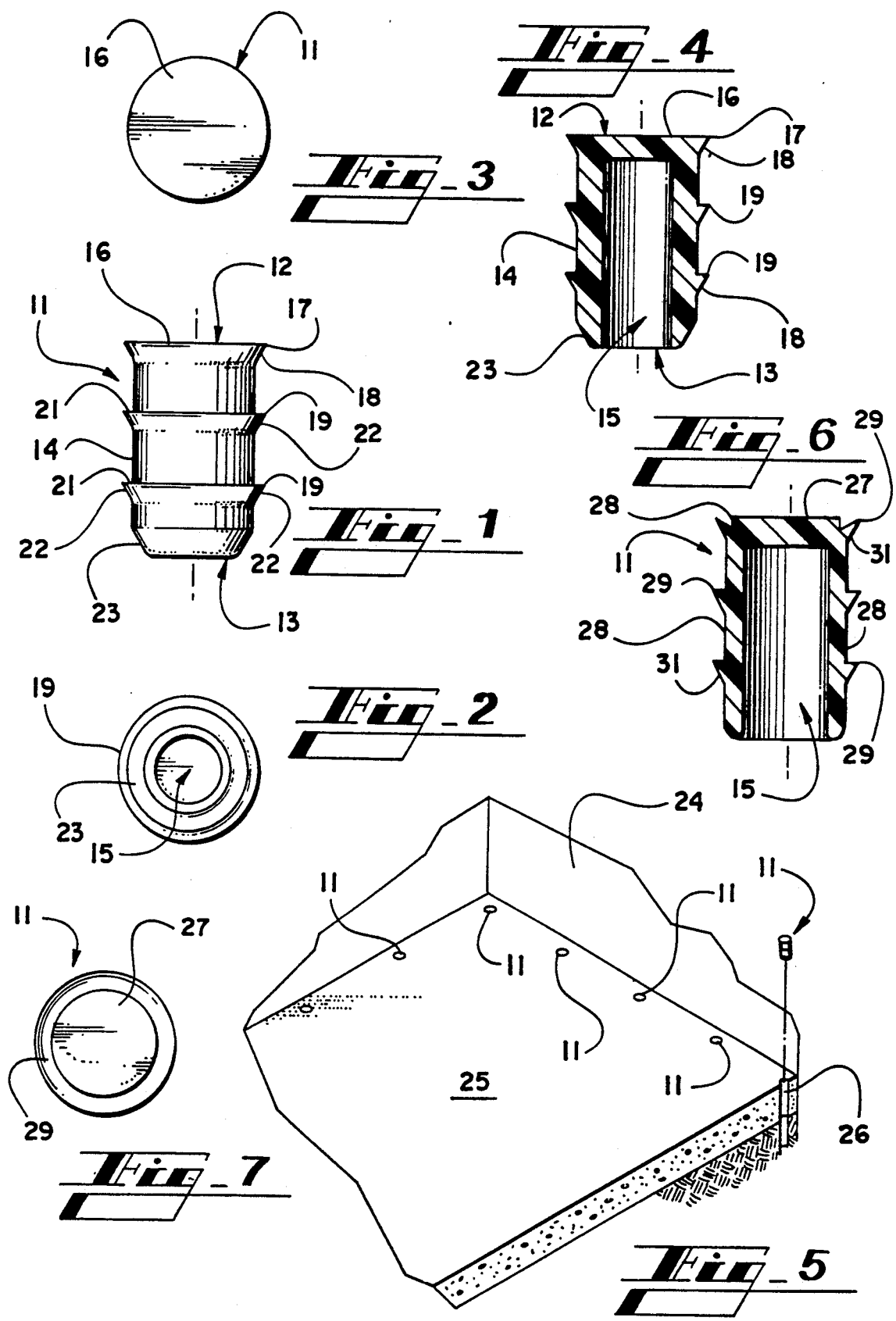

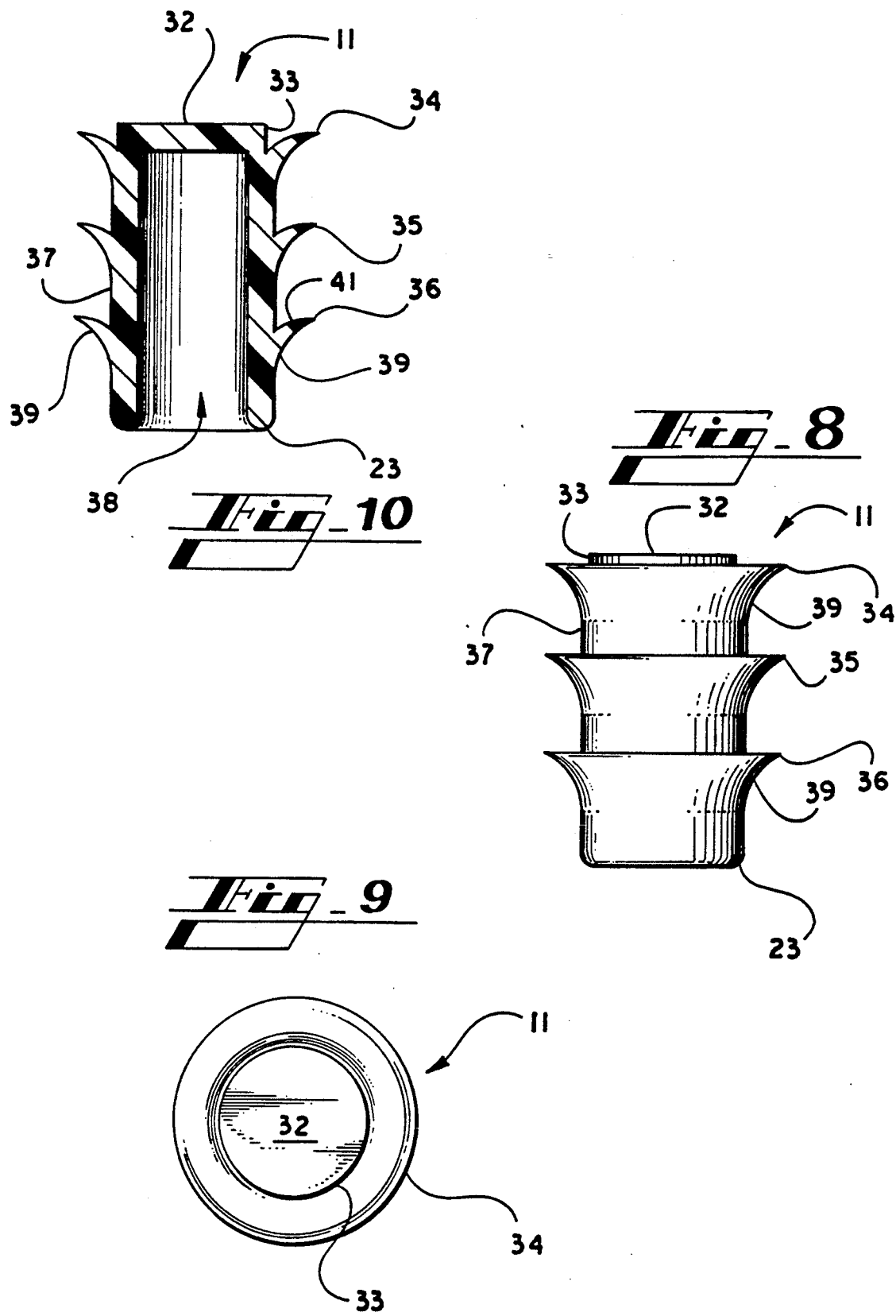

SEALING PLUG FOR APERTURES

This is a continuation-in-part application, Ser. No. 07/717,323 filed Jun. 18, 1991, now abandoned.

BACKGROUND OF THE INVENTION

I. Field of the Invention

The present invention relates generally to the field of a plug device for the sealing of apertures and, more particularly, to a resilient plug which is inserted into a drilled hole in a surface to prevent the discharge from the drilled hole of fluids or chemicals.

II. Description of the Prior Art

In the field of insect control it is quite common that in buildings having termite infestations for the termite control person to drill a series of closely spaced holes through concrete floors, around wall peripheries so that termiticides may be injected into the hole and, subsequently, into the foundation area in which the termite infestation normally occurs.

The typically termiticides, which are utilized in the field termite control, will normally include instructions that the user should securely plug all holes in all areas which are commonly occupied by humans. The purpose of the plugging of the holes is to prevent vapors or fluids from leaking through the holes to the occupied areas and as a secondary benefit to prevent the leakage of ground water, or the like, through the drilled holes. It is well known that the termiticides may well release vapors or fumes through the drilled holes and it is generally recommended that such an event be precluded by the plugging of the drilled holes.

In the past it has been known to utilize small plastic plugs which are forced into the drilled holes by the termite control person after the holes have been filled with the termiticide. However, the previous plugs have been found deficient in their use in that the plugs do not have means for securely maintaining the plugs within a roughly drilled hole in concrete floors, unless the plug is recessed rather deeply into the concrete. It has further found that, even if the plugs are forced into a correctly drilled hole, the prior art plugs will tend to work out of the hole do to vibration temperature changes or other reasons.

SUMMARY OF THE INVENTION

In accordance with the present invention, it is contemplated that a sealing plug will be provided which incorporates means for maintaining the plug in a drilled hole so that the plug does not work itself out of the hole thereby releasing fumes vapors and fluids from termiticides.

It is, therefore, an object of the invention to provide a novel and unique sealing plug for use in the insect control industry and other relevant applications, which plug is designed to securely grip a rough concrete surface when placed in a drilled hole in such surface.

Yet another object of the invention is the provision of a sealing plug for use in drilled apertures in concrete floors which is easily manufactured, is relatively inexpensive and is readily adapted in a wide range of environments to affect the necessary sealing characteristics.

A further object of the invention is the provision of a sealing plug made of soft resilient material which is sufficiently resilient to conform to irregular services, but is firm enough to hold firmly in a drilled hole in a concrete floor.

Other objects, advantages and capabilities of the invention will become apparent from the following description taken in conjunction with the accompanying drawings, showing only a preferred embodiment of the invention.

BRIEF DESCRIPTION OF THE DRAWINGS

FIG. 1 is a vertical elevation view of the sealing plug of the present invention;

FIG. 2 is a bottom plan view;

FIG. 3 is a top plan view;

FIG. 4 is a vertical section view;

FIG. 5 is an overall perspective view of a typical concrete floor showing the preferred installation of the invention;

FIG. 6 is a vertical section of another embodiment;

FIG. 7 is a top plan view of the embodiment of FIG. 6;

FIG. 8 is a vertical elevation view of another embodiment of the sealing plug;

FIG. 9 is a top plan view of the embodiment of FIG. 8; and

FIG. 10 is a vertical section view of the embodiment of FIG. 8.

DESCRIPTION OF THE PREFERRED EMBODIMENTS

Referring to the drawings wherein like reference numerals designate corresponding parts throughout the several figures, the sealing plug of the present invention is generally indicated by the numeral 11. It is anticipated that the plug 11 will be constructed of a resilient plastic which is capable of deforming when placed into a drilled hole to an extent that the plug conforms to the configuration of the hole, but yet is of certain firmness that the plug will not be crushed or deformed to such a degree that the plug will be rendered useless and will not be maintained in the hole in a firm engagement.

The typical plug 11 is of elongated tubular resilient construction having a proximal end 12 and a distal end 13 interconnected by the tubular side wall 14. At the distal end of the plug there is a hollow interior cavity 15 formed during manufacture of the plug which assists in the compressibility of the plug when it is used in its intended purpose.

The top surface 16 has a sealing rim 17 which projects beyond the tubular side wall 14 to form a planar flange to effect complete sealing of the hole and to which a plug is to be placed. In this regard the top sealing rim 17 and its planar flange, which projects past the side wall 14, forms an re-entrant surface 18 which flared inwardly and downwardly toward the distal end of the plug and terminates at the side wall 14 a short distance below the top planar surface 16.

Spaced downwardly from the proximal end 12 are a plurality of sealing means which comprise ribs 19 projecting outwardly from the tubular side wall 14 and adapted to engage the side wall of a drilled hole in the concrete floor to assist in retaining the plug 11 in the hole once it is firmly placed therein. The ribs comprise a planar flange 21 which projects outwardly from the side wall 14 and forms a re-entrant surface. 22 flaring inwardly and downwardly toward the distal end of the plug 11.

At the distal end 13 the tubular side wall of the plug 11 terminates in an inwardly directed bevelled edge 23, which edge assists in positioning the sealing plug into the hole to be sealed and centers the plug so that it can be driven into the hole with the minimum of effort and problems of aligning the plug with the hole prior to setting the plug therein.

FIG. 5 shows a typical environment in which the plug would be utilized, which include vertical wall surfaces 24 and a poured concrete floor 25. The normal installation person would drill relatively small holes 26 (typically of varying diameters from ⅜" to 9/16") through the concrete floor into the underlying ground structure. Then the termiticide would be injected by known injection means through the drilled hole 26 into the possible termite infested ground underneath the floor. Once the termiticide is injected throughout the area to be treated, each hole 26 would be sealed by plug 11. The installation technician would place the distal end 13 of the plug in the hole 26 and then would take a suitable hammer and sharply drive the plug into the hole so that the top surface 16 would be flushed with the floor surface. In the alternative, it may be desirable to set plug 11 deeper into the floor and then put patching material on top of the plug to restore the floor to its original appearance.

The soft resilient material of which the plug is made will conform to any irregularities in the drilled hole and provide a tight seal, and one which will maintain the plug firmly in position and prevent it working loose from vibration or other forces. The material is of a type that will withstand changes in temperature and environmental conditions without shrinking or swelling to such a degree that no vapor or liquid will escape from the drilled hole 26. In addition the ribs 19, once firmly gripped in hole 26, will prevent the plug from being pushed out of the hole by ground water pressure or other forces. It is anticipated that the material from which plug 11 is to be manufactured will be a chemical inert material impervious to vapors or fumes from solvents or from the termiticides used in the environment, and will thus form a seal which will be in compliance with recommendations for using termiticides and other like chemicals.

Another slightly modified embodiment is shown in FIGS. 6 and 7 wherein the top of the plug 11 does not have a uninterrupted flat planar top surface. Instead, it has been found that in some manufacturing procedures it may be desirable to manufacture the plug as shown in this embodiment. In the embodiment shown in FIGS. 6 and 7 the plug 11 has a planar top surface 27 of essentially the same diameter as that of the side walls 28, however, the top surface 27 terminates at the side wall 28 and a top sealing rib 29 projects from a lower position on the side wall in an upwardly and outwardly manner. The re-entrant surface 31 of the rib 29 flares inwardly and downwardly toward, and into, the side wall 28, thusly forming an effective top seal for the plug 11.

Referring now to the embodiment of the invention shown in FIGS. 8, 9 and 10, the sealing plug 11 has an interrupted top surface 32 which terminates at side wall 33, which side wall depends vertically and terminates at the juncture of the top sealing rib 34. In addition to the top sealing rib 34 there are multiple sealing ribs, indicated by numerals 35 and 36, which project outwardly from the plug side wall 37. To give the plug resiliency, the plug, as in previous embodiments, has an interior hollow cavity 38 which projects substantially throughout the entire length of the plug and terminates in conjunction with the underside of top surface 32.

It is important to note that sealing ribs 34, 35 and 36 project upwardly and outwardly from the side wall 37 in an exaggerated curved flare design so as to firmly and positively co-act with interior wall surface of the drilled hole in which the plug is to be placed, thereby providing an effective seal to the hole. Obviously, the combination of the upwardly and outwardly flared curved bottom surface 39 in combination with the outwardly and downwardly curved top flared surface 41 of each sealing rib 34, 35 and 36, terminating in a sharply pointed apex, will provide a great deal of sealing capability and will assist in the compressibility of the sealing plug.

Various modifications may be made of the invention without departing from the scope thereof and it is desired, therefore, that only such limitations shall be placed thereon as are imposed by the prior art and which are set forth in the appended claims.

What is claimed is:

1. A sealing plug for insertion and placement in a drilled hole wherein the plug is maintained in firm engagement with the side walls of the hole, a sealing plug comprising:

a resilient elongated tubular plug having a proximal end and a distal end, the proximal end and the distal end being interconnected by a tubular side wall of the plug, the distal end having an aperture therein in communication with an interior hollow cavity located in the tubular plug, the proximal end having an uninterrupted planar top surface and lying in a single plane, which plane terminates in a depending side wall, the depending side wall having a first predetermined diameter, the tubular side wall of the plug having a second predetermined diameter, the diameter of the planar top surface side wall being less than the second predetermined diameter of the tubular side wall, sealing means located between the proximal end and the distal end, the sealing means projecting outwardly from the tubular side wall for engagement with the side walls of the hole, the sealing means comprising three outwardly projecting sealing ribs, each of the sealing ribs comprising an outwardly projecting flange, the flange forming a re-entrant surface with the tubular side wall flaring upwardly and outwardly away from the tubular side wall, each sealing rib further comprising an upper surface and a lower surface, the upper surface flaring upwardly in a consistent curvature and outwardly from the tubular side wall, the lower surface flaring from a point tangent with the tubular side wall upwardly and outwardly in a consistent curvature and intercepting the upper surface at an acute angle to form an apex with the upper surface of the rib.

2. A sealing plug as claimed in claim 1, wherein the distal end of the plug terminates in an inwardly projecting bevelled edge.

* * * * *